May 15, 1934. C. F. JENKINS Re. 19,171

SYNCHRONIZING SYSTEM

Original Filed Nov. 19, 1924

Inventor:

C. Francis Jenkins

By Darby & Darby

Attorneys.

Reissued May 15, 1934

Re. 19,171

UNITED STATES PATENT OFFICE 19,171

SYNCHRONIZING SYSTEM

Charles Francis Jenkins, Washington, D. C., assignor, by mesne assignments, to Radio Corporation of America, a corporation of Delaware Original No. 1,694,065, dated December 4, 1928, Serial No. 750,801, November 19, 1924. Application for reissue March 18, 1930, Serial No. 436,916

7 Claims. (Cl. 178—69.5)

This invention relates to the radio-photo art, and has for its principal object the transmission of photographs and synchronism on the same wave frequency or wave length.

With this and other objects in view, the invention consists of apparatus for transmitting and receiving radio photos and determining synchronism simultaneously, as hereinafter described and further pointed out in the claims.

Referring to the accompanying drawing forming a part of this specification, in which like symbols refer to like parts in both views;—

Figure 1:
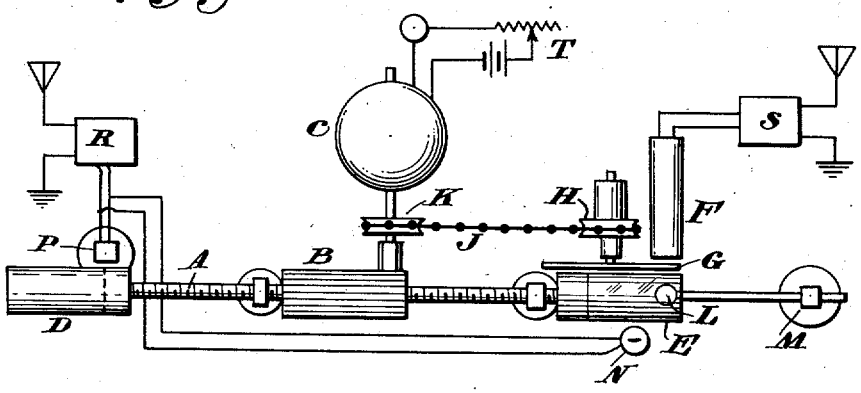
Figure 2:
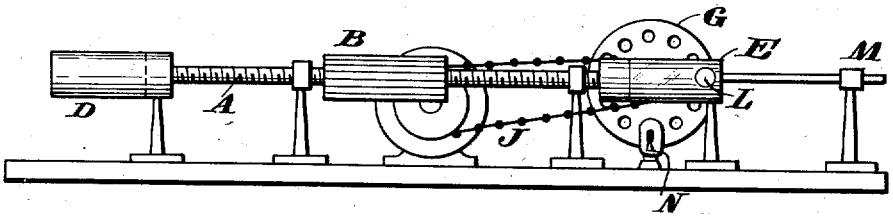
Figure 3:
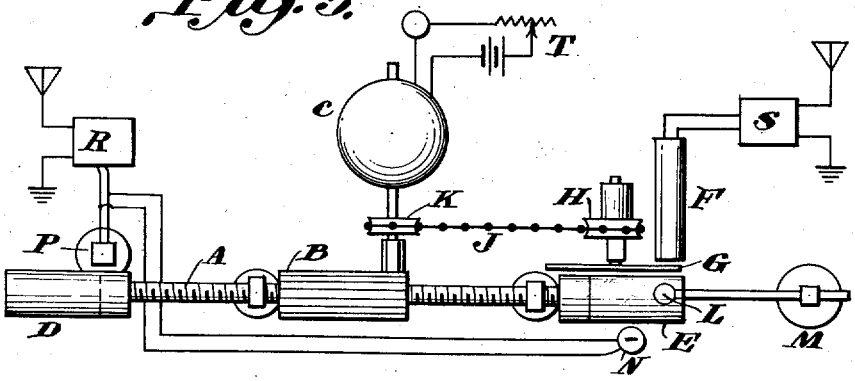

Fig. 1 is a top view of one of the station units; Fig. 2 an elevation of same; and Fig. 3 a top view of a second station unit like the unit in Fig. 1.

In all three of the figures like symbols refer to like parts, in which A is a shaft having a wide-faced gear B thereon rotated by the motor C. On one end of the shaft A is a drum or cylinder D and on the other end a glass cylinder E. Located with its axis at right angles to the glass cylinder E is a tube F having a light sensitive cell therein. Between the sensitive cell F and the glass cylinder E is a light chopper G, on the shaft of which is a pulley H. The chopper is rotated by a beaded chain J engaging a pulley K, on the shaft of the motor C.

Inside the glass cylinder E is a lamp L supported in the bracket M. N is a glow lamp, the function of which is to intermittently illuminate the chopper disc G.

Facing the drum D is a box P having therein a filament, a glow, or other suitable lamp.

The lamp P is connected to the radio receiver R. The light sensitive cell F is connected to the radio sending apparatus S.

The lamp N is also connected to the radio receiver set R.

The motor is rotated and its speed controlled by the battery resistance and switch of the unit T.

When the motor is started the cylinders D and E are revolved, and the light chopper G is also set in rapid rotation. The light of the small lamp L shining through the wall of the glass cylinder impinges on the light cell through the holes in the rotating chopper. These holes cutting across the light with regularity produce a pulsating current of constant frequency. This frequency is put on the radio broadcasting set of the sending station S and is picked up at the receiving set R of the distant station.

As both the chopper and the cylinders are geared to the motor at each station, it is obvious that the chopper frequency bears a definite relation to the rotation of the cylinders (D and E). Therefore, if the incoming chopper frequency signals are made to light and extinguish the lamp N shining on the chopper at the receiving station once for each phase, i. e., each hole in the chopper at the sending station, then this intermittent illumination of the chopper G at the receiving station makes the chopper appear to stand still, if the two stations are in exact synchronism. If the stations are out of step the illuminated chopper appears to slowly rotate to the right or the left, which the proper adjustment of the rheostat T corrects.

Each station unit is like the other, and on the glass cylinder E of each a transparency is put, a typewritten message, for example; and on the cylinder D a light-sensitive paper or film is put.

The method of changing the light values of the picture or message put on the cylinder, and the operation of the means shown for converting the same into radio currents, and at the receiving station putting these radio current values back into a picture or a message, are well known, and perhaps it is not here necessary to relate them. However—

It might be suspected that the passing of the letters across the light-cell would make the stroboscopic observation of synchronism ineffective, but this not the case, and the reason it does not is principally because the chopper frequency is so much higher than the letter (picture) frequency that there is no noticeable interference.

It will be obvious to those skilled in the art that many modifications are possible of the apparatus herein described and illustrated without departing from the spirit of the invention herein disclosed, which is to send and receive both a uniform frequency and an ununiform frequency at the same time and both on the same radio wave.

What I claim, is—

1. In a radiographic system the method of operation which consists in interrupting a modulated light beam a plurality of times for each picture line to produce a synchronizing current, transmitting said signal and synchronizing currents on a single carrier wave, receiving said carrier wave, separating said currents at the receiver, and using said synchronizing current to produce a stroboscopic indication of synchronization.

2. Radiographic apparatus comprising a sending device comprising a rotating element, a receiving device comprising a rotating element, a motor for driving said rotating elements, means for producing a modulated light beam, a shutter driven by said motor for producing synchronizing current when the apparatus is used for sending by interrupting said beam a plurality of times for each picture line, and means responsive to received synchronizing current to produce a stroboscopic effect with said shutter when the apparatus is used for receiving.

3. Picture transmission apparatus comprising a sending drum, a receiving drum, a motor for operating said drums, a light beam, means for modulating said beam, a shutter driven by said motor for producing a synchronizing current by interrupting said beam when said apparatus is used for sending, and means responsive to the synchronizing current for producing a stroboscopic effect with said shutter when said apparatus is used for receiving.

4. Picture transmission apparatus comprising a sending drum, a receiving drum, means for rotating said drums, a light inside said sending drum, light responsive means in apposition thereto, a shutter between said sending drum and said light responsive means, said shutter being driven by said motor to interrupt the modulated beam a plurality of times for each picture line to produce a synchronizing current, and means responsive to received synchronizing signals for producing a stroboscopic effect with said interrupting device.

5. Radiographic apparatus comprising a rotating sending device, a rotating receiving device, a motor for driving said devices, a light source, a light responsive device in apposition thereto, means for varying the intensity of the light received by said responsive device in accordance with signals to be transmitted, a shutter between said light source and said light responsive device to interrupt the modulated beam a plurality of times for each picture line to produce a synchronizing current, and means responsive to received synchronizing current for determining the speed of said shutter.

6. In picture transmission apparatus, the method of operation which consists in modulating a light beam with areas of a picture to be transmitted, interrupting the signal modulated light beam a plurality of times for each picture line to produce a synchronizing current, transmitting said signal modulated synchronizing current, receiving said current and separating the components of the received currents to reproduce the picture and to produce an indication of synchronism.

7. In apparatus for transmitting pictures, a light beam, means for modulating said light beam, a shutter, and means for operating said shutter to interrupt said beam a plurality of times for each picture line to produce a synchronizing current.

CHARLES FRANCIS JENKINS.